J. F. Page,
Spark Arrester,
Nº 23,602.               Patented Apr. 12, 1859.

Witnesses:                                Inventors:

UNITED STATES PATENT OFFICE.

JOHN F. PAGE, OF PHILADELPHIA, PENNSYLVANIA.

SPARK-ARRESTER.

Specification of Letters Patent No. 23,602, dated April 12, 1859.

*To all whom it may concern:*

Be it known that I, J. F. PAGE, of the city and county of Philadelphia and State of Pennsylvania, have invented a new and useful Improvement in Spark-Arresters; and I do hereby declare the following to be a full, clear, and exact description of the same, reference being had to the accompanying drawing and to the letters of reference marked thereon.

My invention consists in a casing having a number of openings at the side, and a deflecting plate attached to the upper edge of each opening, said casing being arranged in respect to the chimney, the deflector above the same, and the exterior casing of a spark arrester, substantially as described hereafter, so as to afford a means of readily disposing of the sparks, and of allowing a free uninterrupted space for the escape of the steam, and products of combustion.

In order to enable others to make and use my invention, I will now proceed to describe its construction and operation.

Figure 1:
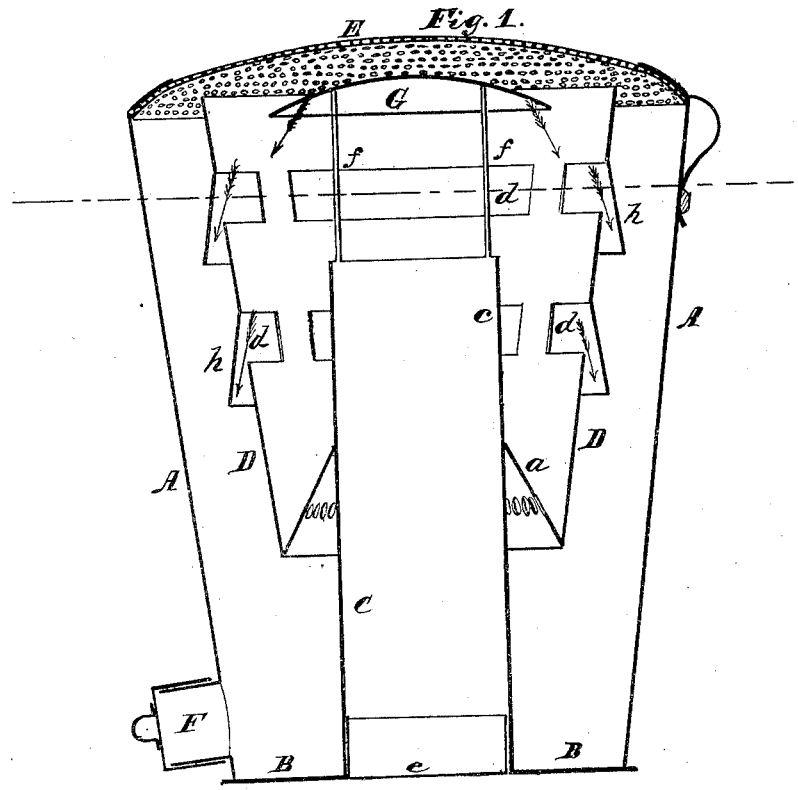
Figure 2:
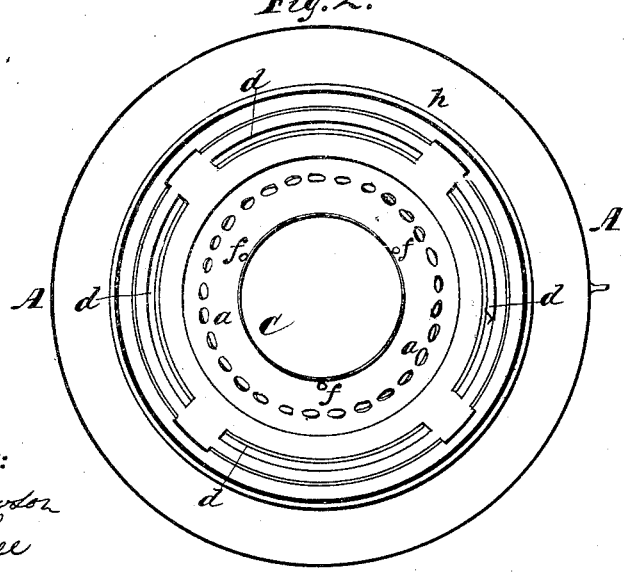

On reference to the accompanying drawing which forms part of this specification—Figure 1 is a sectional elevation of my improved spark arrester. Fig. 2 a sectional plan on the line 1, 2 Fig. 1.

The exterior casing A of my improved spark arrester is of the usual form, larger in diameter at the top than at the bottom, and secured to a plate B. On the edge of an opening $e$ in the latter plate is secured a chimney C and to the latter is attached by means of a circular cone-shaped plate $a$, the intermediate casing B, which is also larger in diameter at the top than at the bottom.

The top of the exterior casing A is covered by a perforated plate E or by the usual wire gauze, and at the bottom is the usual opening F furnished with a detachable cover, on withdrawing which the sparks collected at the bottom of the exterior casing may be withdrawn.

To the upper edge of the chimney are secured three or more rods $f, f$, which support a deflector G, the latter being on a level or thereabout with the upper edge of the exterior casing.

In the side of the intermediate casing and around the same, are two sets of openings $d$, one set above the other, and to the upper edge of each of these openings is secured a deflecting plate $h$.

The sparks passing with the steam through the chimney $c'$ are impelled with force against the deflector G from which they recoil, taking an angular direction and passing through the openings $d$ in the intermediate plate B.

The deflecting plates $h$ serve to guide the sparks downward as they pass through the openings and prevent them from rising in the space between the exterior and intermediate casing. Such of the sparks as may not be directed through the openings, $d$, fall into the cone-shaped plate, $a$, and passing through openings in the same drop to the bottom of the outer casing in the space between the latter and the chimney. The sparks are thus readily disposed of before they can reach the gauze covering of the outer casing, leaving a free and uninterrupted space for the escape of the steam and products of combustion.

I claim and desire to secure by Letters Patent:—

The intermediate casing B, with its openings, $d$, and deflecting plates, $h$, when arranged in respect to the chimney, $c$, the deflector, G, and outer casing A, substantially as, and for the purpose herein set forth.

In testimony whereof, I have signed my name to this specification in the presence of two subscribing witnesses.

JOHN F. PAGE.

Witnesses:
  HENRY HOWSON,
  HENRY ODIORNE.